1,081,980 12/1954 France ..................................73/349

United States Patent
Gottron et al.

[15] 3,706,227
[45] Dec. 19, 1972

[54] PNEUMATIC THERMOMETER

[72] Inventors: Richard N. Gottron, Kensington, Md. 20795; Wilmer Gaylord, Washington, D.C. 20011

[73] Assignee: The United States of America as represented by the Secretary of the Army

[22] Filed: March 27, 1963

[21] Appl. No.: 268,497

[52] U.S. Cl..................73/339 A, 137/81.5, 235/201
[51] Int. Cl. .............................................G01k 11/26
[58] Field of Search..........251/802; 137/83 PF, 81.5; 73/349, 357, 339 A; 235/201

[56] References Cited

UNITED STATES PATENTS

| | | | |
|---|---|---|---|
| 2,970,475 | 2/1961 | Werner | 73/357 |
| 3,030,979 | 4/1962 | Reilly | 137/81.5 |
| 3,093,306 | 6/1963 | Warren | 137/81.5 |
| 3,158,166 | 11/1964 | Warren | 235/201 |

FOREIGN PATENTS OR APPLICATIONS

| | | | |
|---|---|---|---|
| 145,745 | 3/1952 | Australia | 73/349 |
| 1,081,980 | 12/1954 | France | 73/349 |

*Primary Examiner*—Reuben Epstein
*Attorney*—Harry M. Saragovitz, Edward J. Kelly, Herbert Berl and R. C. Lucke

[57] ABSTRACT

A pneumatic thermometer is disclosed having a fluid operated oscillator in which the frequency is sensitive to temperature changes. The oscillator is of an open type and contains a stilling chamber to dampen out the oscillation. The pulses obtainable from the oscillator chambers are fed to a transducer and the output of the transducer is fed to a pulse converter to which a temperature calibrated indicator is connected.

3 Claims, 2 Drawing Figures

RICHARD N. GOTTRON
WILMER GAYLORD
INVENTORS

BY Harry M. Saragovitz,
Edward J. Kelly,
Herbert Berl &
R. C. Lucke

PNEUMATIC THERMOMETER

The invention described herein may be manufactured and used by or for the Government of the United States of America for governmental purposes without the payment to us of any royalty thereon.

This invention relates generally to temperature sensing devices and, more particularly, to a pneumatic thermometer.

Prior thermometers have a slow response time to temperature changes. This time lag, in many cases was great enough to render the use of such thermometers impractical. Further, prior thermometers were fragile, limited in their temperature ranges, sensitive to vibration and nuclear radiation, and the indication of the temperature changes was insufficient in magnitude to provide reliable accuracy.

We have provided in this invention a thermometer which has a substantially instantaneous response time to temperature changes, far faster than any known prior thermometers. The thermometer of this invention operates over a wide temperature range with precise calibration of temperature values. It is insensitive to environmental vibration, is practically indestructible in normal use and is insensitive to nuclear radiation. A component part of this invention is a fluid-operated oscillator which is highly sensitive to temperature changes and is equally insensitive to a wide range of changes in other fluid parameters such as pressure and density. There are no moving parts. The entire structure can be made to have practically limitless operational life when constructed in accordance with the requirements of the environment in which it is employed.

Therefore, it is an object of this invention to provide a pneumatic thermometer which is sensitive to temperature changes.

It is another object to provide a thermometer which has a rapid rate of response to temperature variation.

Still another object of this invention is to provide a pneumatic thermometer which is comparatively insensitive to all fluid parameters except temperature.

A further object of this invention is to provide a pneumatic thermometer having an oscillator which operates at a frequency range that is adequate for precise temperature calibration.

A still further object of this invention is to provide a pneumatic thermometer which is readily adaptable to operate over a wide temperature range.

Another object of this invention is to provide a pneumatic thermometer which is insensitive to vibrations and nuclear radiation, and has no moving parts nor any breakable parts.

Still another object of this invention is to provide a pneumatic thermometer having an extremely long operational life.

A further object of this invention is to provide a pneumatic thermometer in which the principles of fluid amplification are employed.

The specific nature of the invention, as well as other objects, uses and advantages there, will clearly appear from the following description and from the accompanying drawings, in which.

Briefly, the structure of this invention includes a fluid-operated oscillator in which the frequency is exceptionally sensitive to temperature changes and remarkably insensitive to pressure changes. The oscillator is made relatively pressure insensitive by the use of an open chamber type oscillator and by the incorporation of a stilling chamber to dampen out the oscillation and by controlling the amount of fluid that egresses from the stilling chamber. The pulses obtainable from the oscillator chambers are fed to a transducer which translates these pulses, representative of the frequency of the oscillator and, therefore, the temperature of the fluid flowing through the oscillator. The output of the transducer is fed to a pulse converter to which a temperature calibrated indicator is connected. The thermometer is placed in the flow of the fluid the temperature of which is to be determined.

Figure 1:
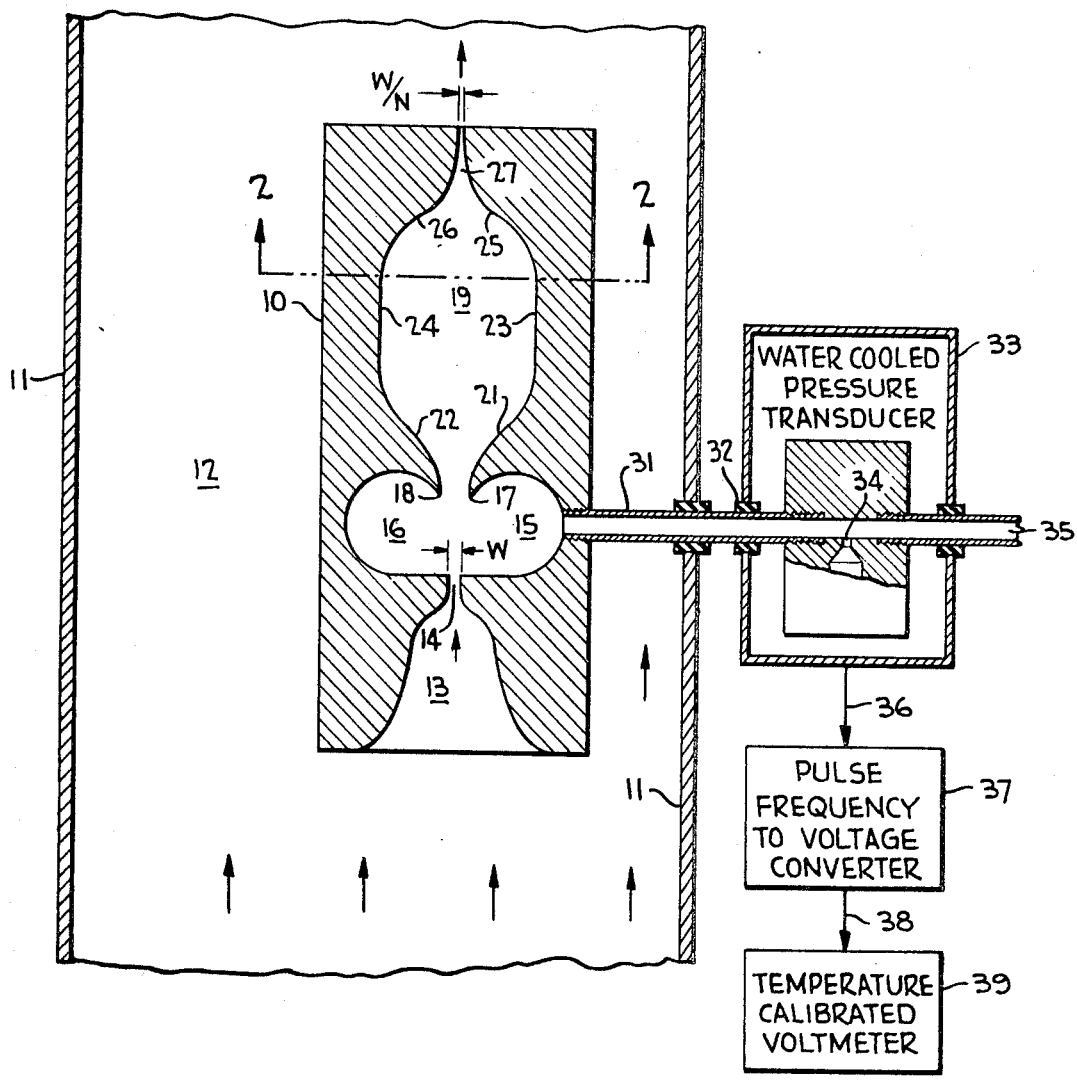
FIG. 1 is a pictorial view combined with block diagrams of an embodiment of this invention.

Turning now to the drawings in which is illustrated a typical embodiment of this invention, FIG. 1 shows a fluid operated thermometer 10 which is located within a confining means 11 for a moving fluid 12 the temperature of which is to be determined. The moving fluid 12 can be steam in a heating system, the power flow of a jet engine, or the like. The fluid operated thermometer 10 has a bell shaped fluid intake channel 13 directly in the fluid flow path within the confining means 11. The intake 13 tapers to a nozzle 14 at its downstream end. Nozzle 14 directs a jet fluid flow into an oscillator made up of a right chamber 15, a left chamber 16, a right jet edge 17, a left jet edge 18, and a stilling chamber 19. All of the foresaid component parts of the fluid thermometer 10 are symmetrically disposed about the axis of the nozzle 14. The fluid egressing from nozzle 14 is directed toward the opening between chambers 15 and 16 and edges 17 and 18 into the stilling chamber 19. Due to the instabilities in the jet flow egressing from nozzle 14, the fluid stream will approach either edge 17 or 18. When this occurs, a significant amount of the fluid stream will pass on the chamber 15 side of point 17 instead of the total amount going directly into chamber 19, for example, and such diverted fluid stream will then proceed around the circular walls of chamber 15 and be diverted toward the nozzle 14 in a perpendicular relationship. The arrival of the diverted fluid at the jet stream coming from nozzle 14 will move the jet stream away from edge 17 toward edge 18 and the fluid stream will then proceed around the circular wall of chamber 16 to approach the jet from nozzle 14 in a perpendicular direction which is opposite to the direction traveled by a fluid stream around chamber 15. The arrival of the fluid stream around chamber 16 at the jet stream from nozzle 14 will divert the jet stream toward edge 17 and chamber 15 and the operation is repeated to sustain oscillation as long as the jet flow through nozzle 14 is maintained above a minimum by the flow of fluid 12 within the means 11. The jet fluid flow from nozzle 14, when impinging on the jet edge 17 or 18, will oscillate about such edge in response to the well-known jet-edge effect to initiate the oscillation. The left and right chambers 15 and 16, respectively, are of generally circular configuration beginning with edges 17 and 18, respectively. This circular configuration extends to a straight line configuration which is tangent to the two circular configurations and perpendicular to the nozzle 14.

Figure 2:
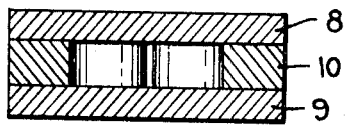
FIG. 2 is a sectional view of the fluid amplifier of this invention as seen along line 2—2 in FIG. 1.

The pneumatic thermometer is constructed of three plates or layers as is shown in FIG. 2, with a center layer 10, a top layer 8, and a bottom layer 9. The center layer is sawed, cut, etched, bored, or formed by any other suitable means, to provide the intake channel 13, the nozzle 14, the right and left chambers 15 and 16, respectively, the stilling chamber 19, the egress nozzle 27 and the output opening in communication with tube 31. The top and bottom layers form sealing plates which prevent the leakage of fluid and which confine the moving fluids in the thermometer to the plane of deflection of the jet issuing from nozzle 14. The layers are made of suitable material such as brass, aluminum or plastic, provided the selected material is consistent with the temperature range to which the thermometer is subjected.

As the jet flow egresses from the oscillator chamber section into the stilling chamber 19, the sides 21 and 22 are set back a sufficient distance that the jet flow will lock into such sides. Stilling chamber 19 provides for the divergence of the jet flow and the sides 23 and 24 are sufficiently separated to contribute to the damping of the oscillation from the oscillator section. Stilling chamber 19 is large enough to allow the jet flow to approach stagnation in its operation as a pressure reservoir. The flow through the egress nozzle 27 is steady. The downstream sides 25 and 26 of stilling chamber 19 are shaped to provide smooth flow out through nozzle 27 with no reflection of fluid pulses. The geometry of stilling chamber 19 is such that Hartman type oscillations are prevented therein. The size of the egress nozzle 27 is determined by the size of the nozzle 14. For a sonic flow through nozzle 27, a larger nozzle 14 is required to give a sub-sonic flow through nozzle 14 to provide an increased signal to noise ratio.

Output tube 31 is connected from one of the oscillator chambers, chamber 15 in the illustration, at a point on the curved periphery thereof. Output tube 31 removes fluid pulses from oscillator chamber 15 which are representative of the frequency of oscillation of the oscillator, and, therefore, the temperature of the fluid through the thermometer 10 and the confining means 11.

Output tube 31 is connected between the right chamber 15 through the side wall of the confining means 11 through a transducer structure 33 which can provide cooling to protect a pressure sensitive transducer 34 which is, for example, placed in such a manner as to sense the fluid pulses as they pass by a side of output tube 31. Tube 31 can terminate in a sound absorbing capacitance (not shown) to absorb the sound and prevent reflections. Alternatively, tube 31 can dump into the ambient region through end 35.

The output of the transducer 34 is electrical pulses which are applied through connector 36 to a pulse frequency to voltage converter 37, the output of which is applied through connector 38 to a temperature calibrated voltmeter 39. The voltmeter 39 is the indicating means which reveals the temperature of the fluid 12 in confining means 11.

It is within the scope of this invention that other means be employed to utilize the output through tube 31. For example, the output from tubes 31 can be utilized as the input of a fluid counter system, or the output of the transducer 33 can be utilized to perform various desired functions in response to temperature changes in the moving fluid 12.

It is seen that we have provided a temperature sensitive fluid-operated system which is minimal in its sensitivity to the other fluid amplifier parameters. The response time is very near instantaneous since the fluid to be tested is in fact the fluid producing the detectable oscillations that reveal the temperature. The fluid amplifier body is immersed in the fluid the temperature of which is to be measured and the remoteness of the transducer due to temperature considerations or any other consideration does not increase the time lag since the fluid pulses travel at the speed of sound. It is also true that the fluid oscillator can be fed by a tube instead of by the air scoop 13 shown. The temperature of the fluid as it arrives at the oscillator would be determined.

We have provided a pneumatic thermometer which has no moving parts and has a practically unlimited operating life. The precision of temperature determination is exceptionally high.

It is desired that the fluid flow through nozzle 14 have a flow velocity in the range of Mach number 0.5 and 0.9. At sonic speed in the throat of the nozzle, shock waves will interfere with the pressure propagation in the cavity, creating noise. For small Mach numbers, that is, less than 0.5, the harmonics in the cavity become large, giving rise to false frequency readings of the fundamental.

The first response time accomplished by this pneumatic thermometer is accomplished by the fluid oscillator having a fast flush-out time. The flush-out time is the time required for the temperature of the fluid in the cavity to become equal to the temperature of the input fluid, when the temperature of input fluid is increased by a step function.

It is to be noted that this fluid oscillator operates with a sensitivity that is in the order of, for example, switching a 15 psi power stream with a 2 psi control signal.

In the fluid oscillator, the frequency of oscillation, when air is the fluid used, is given by:

$$f = \sqrt{\gamma R T}/4l$$

where
 $f$ is frequency in cycles per second,
 $\gamma$ is the ratio of specific heats,
 $R$ is the gas constant (1716 foot pounds per slug °R),
 $T$ is the temperature (°R) and
 $l$ is the distance from the jet to the chamber wall 15 or 16 in feet.

The foregoing expression for f will be better understood when it is pointed out that the velocity of sound $v$ in a gas is given by $v = \sqrt{\gamma R T}$. See page 286 of *Fluid Mechanics* by R. C. Binder, Prentice Hall, 1955. Skilled persons will understand that the fundamental resonant frequency of the composite chamber consisting of left and right chambers 15 and 16 will be a function of the total length of the composite chamber and of the velocity of sound in the gas in the chamber. As is indicated above, the velocity of sound in a gas is dependent on absolute temperature T but is independent of pressure. See also page 1676 of *Marks' Mechanical Engineers' Handbook*, McGraw-Hill, 1951. Thus the frequency of the oscillator of FIG. 1 is not dependent on static fluid pressure within confining means, or duct, 11, nor is the frequency appreciably dependent on the velocity of the fluid 12, provided the velocity is high enough to cause oscillation to start.

It will be apparent that the embodiments shown are only ex-emplary and that various modifications can be made in construction and arrangement within the scope of the invention as defined in the appended claims.

We claim as our invention:

1. Apparatus for measuring the temperature of a gas flowing through a duct, said apparatus comprising:
   a. a fluid-operated oscillator so positioned in said duct that a portion of said gas flows through said oscillator while a portion of said gas flows around said oscillator, said oscillator comprising:
      1. a generally bell-shaped intake channel adapted to receive a portion of said gas,
      2. resonant chamber,
      3. an input nozzle interposed between said intake channel and said resonant chamber,
      4. a stilling chamber,
      5. a pair of jet edges symmetrically disposed about the axis of said input nozzle between said resonant chamber and said stilling chamber and,
      6. an egress nozzle providing an exhaust from said stilling chamber and having a substantially smaller diameter than said input nozzle, so that the velocity of flow of gas past said jet edge approaches but does not exceed a predetermined limiting velocity regardless of increases in the pressure or velocity of the gas at said input nozzle,
   b. the fundamental frequency of said oscillator being determined by the dimensions of said resonant chamber in relation to the velocity of sound in the gas within said resonant chamber, said velocity being dependent on temperature and substantially independent of pressure,
   c. a pressure sensitive electrical transducer at a location remote from said resonant chamber,
   d. a tube conducting an acoustical signal from said resonant chamber to said transducer,
   e. cooling means for preventing the temperature of said transducer from rising to an excessive value regardless of the temperature of the gas in said duct and in said resonant chamber,
   f. pulse-frequency-to-voltage converter means for converting the electrical output of said transducer to a voltage the amplitude of which is proportional to the frequency of said acoustical signal, and
   g. a temperature-calibrated voltmeter for measuring the output of said converter.

2. Apparatus for measuring the temperature of a flowing gas comprising:
   a. a fluid-operated oscillator having:
      1. a resonant chamber,
      2. an input nozzle conducting a portion of said flowing gas into said resonant chamber,
      3. a stilling chamber the dimensions of which are large in relation to said resonant chamber,
      4. a pair of jet edges symmetrically disposed about the axis of said input nozzle between said resonant chamber and said stilling chamber,
      5. an egress nozzle providing an exhaust from said stilling chamber, said egress nozzle being small in relation to said input nozzle whereby the velocity of flow of gas past said jet edges approaches but does not exceed a predetermined limiting velocity regardless of increases in the pressure or velocity of the gas at said input nozzle so that said resonant chamber is excited in its fundamental mode rather than higher modes even when very high input pressures or velocities are applied to said input nozzle,
      6. the fundamental frequency of said oscillator being determined by the dimensions of said resonant chamber in relation to the velocity of sound in the gas within said resonant chamber, such velocity being dependent on temperature and substantially independent of pressure,
   (c) means for positioning said flowing gas so that a portion of the gas flows into said input nozzle, impinges on said jet edges to actuate said oscillator, and exhausts through said egress nozzle, and
   (d) means for measuring the frequency of the acoustical signal generated by said oscillator, said frequency providing a measure of the temperature of said gas.

3. Apparatus for measuring the temperature of a flowing gas comprising:
   a. a fluid-operated oscillator having:
      1. a resonant chamber,
      2. an input nozzle conducting a portion of said flowing gas into said resonant chamber,
      3. an egress nozzle,
      4. a pair of jet edges symmetrically disposed about the axis of said input nozzle between said input nozzle and said egress nozzle,
   b. the fundamental frequency of said oscillator being determined by the dimensions of said chamber in relation to the velocity of sound in the gas within said chamber, such velocity being dependent on temperature and independent of pressure,
   c. means for positioning said oscillator in relation to said gas so that a portion of the gas flows into said input nozzle, impinges on said jet edges to actuate said oscillator, and leaves through said egress nozzle,
   d. an electromechanical transducer at a location remote from said chamber for converting the acoustical signal generated by said oscillator to an electrical signal the frequency of which provides a measure of the temperature of said gas,
   e. means for transmitting said acoustical signal from said chamber to said transducer,
   f. means for maintaining the temperature of said transducer at a temperature different from that of said chamber, and
   g. means connected to said transducer for measuring the frequency of said electrical signal.

* * * * *